United States Patent
Fujita et al.

(10) Patent No.: US 9,116,021 B2
(45) Date of Patent: Aug. 25, 2015

(54) SENSOR DEVICE

(75) Inventors: Hiroshi Fujita, Chiyoda-ku (JP);
Mitsuhiro Ono, Chiyoda-ku (JP);
Hidenori Matano, Chiyoda-ku (JP);
Hiroshi Kobayashi, Chiyoda-ku (JP);
Shigeki Tsujii, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 574 days.

(21) Appl. No.: 13/428,094

(22) Filed: Mar. 23, 2012

(65) Prior Publication Data
US 2012/0291542 A1 Nov. 22, 2012

(30) Foreign Application Priority Data

May 18, 2011 (JP) .................................. 2011-111020
Oct. 20, 2011 (JP) .................................. 2011-230420

(51) Int. Cl.
*G01D 11/24* (2006.01)

(52) U.S. Cl.
CPC .................................. *G01D 11/245* (2013.01)

(58) Field of Classification Search
None
See application file for complete search history.

(56) References Cited

U.S. PATENT DOCUMENTS

| | | | | |
|---|---|---|---|---|
| 5,486,758 | A * | 1/1996 | Hammerle | 327/174 |
| 6,793,533 | B2 * | 9/2004 | Berg et al. | 439/620.04 |
| 7,192,317 | B2 * | 3/2007 | Nakagawa et al. | 439/736 |
| 7,812,598 | B2 * | 10/2010 | Yasuda et al. | 324/207.25 |
| 2004/0080314 | A1 * | 4/2004 | Tsujii et al. | 324/207.21 |

FOREIGN PATENT DOCUMENTS

| | | |
|---|---|---|
| CN | 1904563 A | 1/2007 |
| JP | 2004-144601 A | 5/2004 |
| JP | 2004-309448 A | 11/2004 |
| JP | 2006-308330 A | 11/2006 |

OTHER PUBLICATIONS

Chinese Office Action, issued May 20, 2014, Patent Application No. 201210124311.X.

* cited by examiner

*Primary Examiner* — Robert R Raevis
(74) *Attorney, Agent, or Firm* — Sughrue Mion, PLLC (57) ABSTRACT

A sensor device includes a detector portion, plural metal terminals that transmit a detection signal from the detector portion, and a housing portion, which integrally supports the detector portion and metal terminals, formed from resin, leading end portions of the plural metal terminals configuring connector terminals, and the plural metal terminals being disposed with at least one portion thereof aligned when seen from the axial direction of the connector terminals, wherein protruding portions protruding in a direction differing from the axial direction of the connector terminals are provided on the metal terminals.

8 Claims, 10 Drawing Sheets

SENSOR DEVICE

BACKGROUND OF THE INVENTION

1. Field of the Invention

The present invention relates to a sensor device of a rotation detection device, or the like, used in detecting rotation of various kinds of rotating body subject to detection in, for example, a vehicle-mounted engine or general machine, and in particular, relates to a sensor device wherein a housing portion that grips the main body of the sensor device is molded from resin.

CROSS-REFERENCE TO RELATED APPLICATIONS

This application is related to copending application Ser. No. 13/314993, filed Dec. 8, 2011, commonly assigned with the present invention.

2. Description of the Related Art

To date, as a sensor device used in detecting rotation of various kinds of rotating body subject to detection in a vehicle-mounted engine or general machine, there is one that includes a detector portion disposed so as to oppose a rotor, which is a rotating body subject to detection, a housing portion that supports the detector portion, and a fastening flange, formed integrally with the housing portion, used for fastening to, for example, an engine body, as disclosed in, for example, Patent Document 1.

Figure 10:
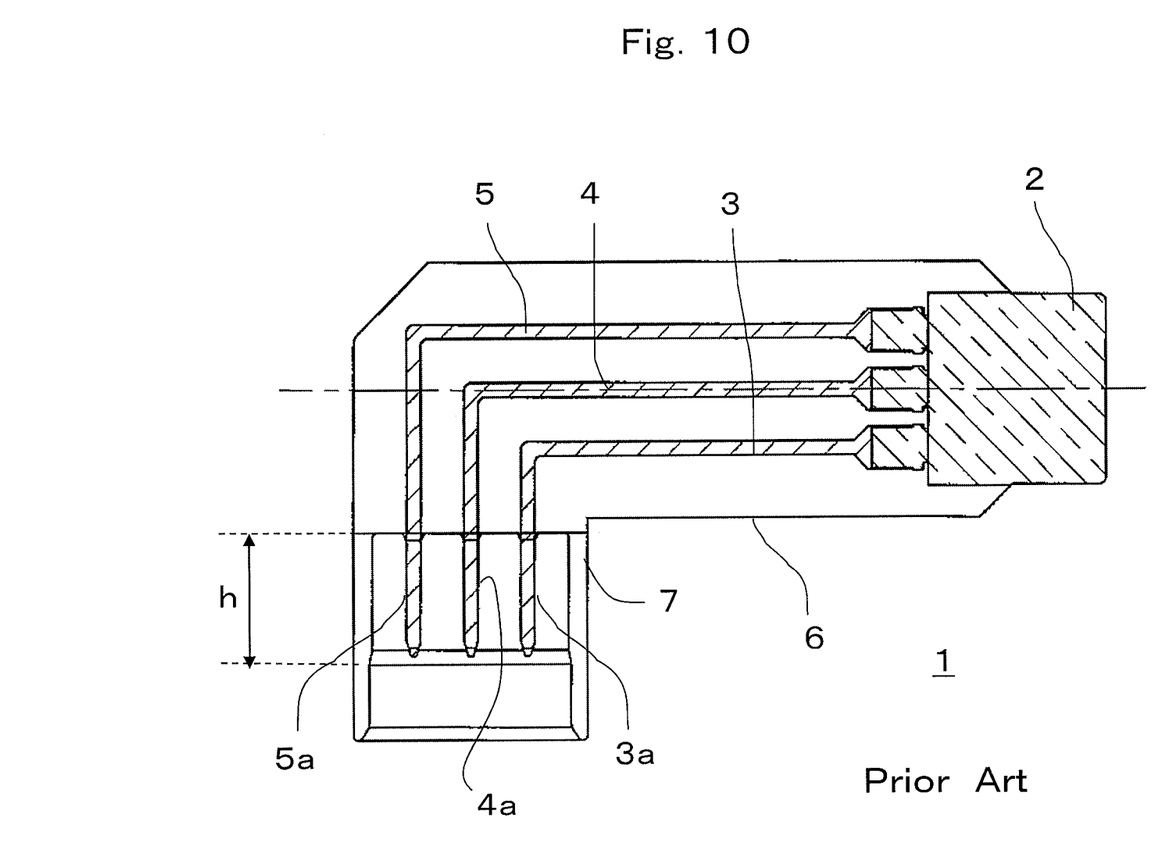
FIG. 10 is a sectional view of a heretofore known sensor device seen from the front.

The sensor device is configured as shown in FIG. 10. That is, the sensor device 1 includes, for example, three electrodes (not shown) electrically connected to a sensor chip incorporated into a detector portion 2, and the electrodes are connected one each by welding or the like to the base end portions of three metal terminals 3, 4, and 5 that form, for example, a power supply terminal, an output terminal, and a ground terminal of the detector portion 2. The three metal terminals 3, 4, and 5 are extended from the detector portion 2 in such a way as to be aligned with each other in the same perpendicular plane direction, that is, in the up-down direction in FIG. 10, and the metal terminals 3, 4, and 5 and detector portion 2 are integrally supported by a housing portion 6 molded from a molding resin or the like. Then, there is configured a connector portion 7 with leading end portions 3a, 4a, and 5a (portions of the metal terminals exposed outside the molding resin) of the metal terminals 3, 4, and 5 as connector terminals.

Patent Document 1: JP-A-2006-308330 (Paragraph 0004, FIG. 4)

The sensor device 1 configured as heretofore described is such that the form thereof and the orientation of the connector portion 7 may be decided in accordance with the form of a site to which the sensor device 1 is attached and the peripheral space. In this case, a method is adopted whereby the form of the metal terminals 3, 4, and 5 is arranged into an appropriate form. For example, when the orientation of the connector portion 7 is perpendicular to the axes of the metal terminals 3, 4, and 5 connected to the detector portion 1, as shown in FIG. 10, the orientation of the leading end portions 3a, 4a, and 5a of the metal terminals 3, 4, and 5 is aligned with the orientation of the connector portion 7 by the metal terminals 3, 4, and 5 being of a form bent partway along into a perpendicular direction.

However, as the leading end portions 3a, 4a, and 5a of the metal terminals 3, 4, and 5 fit into female connector side terminals in the connector portion 7, and transmit a detection signal of the detector portion 1, a desired accuracy is needed for the dimensions of the leading end portions 3a, 4a, and 5a. For example, in the sensor device 1, wherein the exteriors of the housing portion 6, connector portion 7, and the like, are formed by molding a molding resin, the distance from the leading ends of the leading end portions 3a, 4a, and 5a to the end face of the molding resin covering the leading end portions 3a, 4a, and 5a, that is, a pin height h, affects the fitting condition of the connector portion 7, meaning that it is important to obtain an appropriate accuracy of the pin height h. The accuracy of the pin height h depends on positioning accuracy when inserting the leading end portions 3a, 4a, and 5a of the metal terminals 3, 4, and 5 into a molding die.

Figure 11:
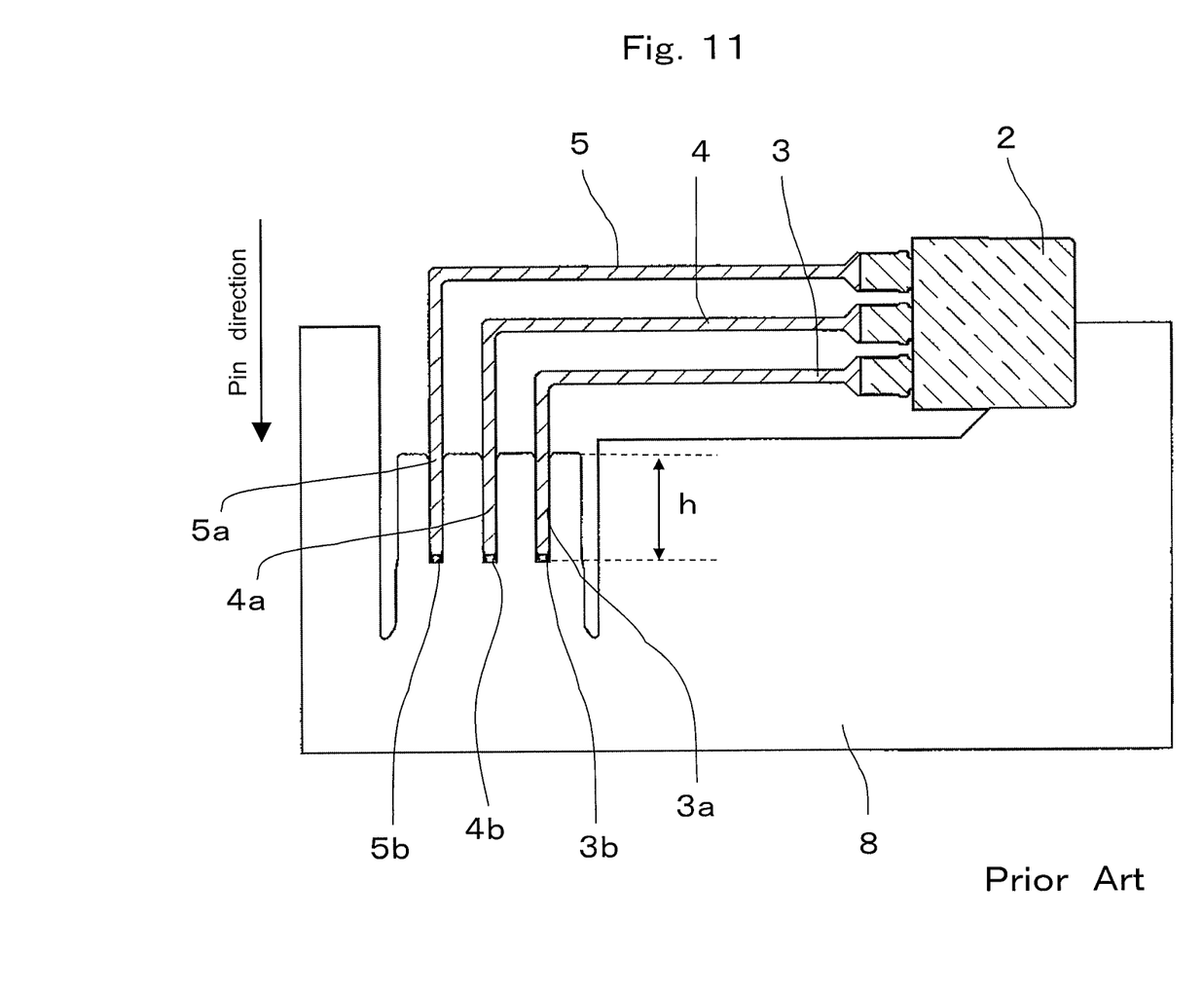
FIG. 11 is a diagram showing a condition before molding of metal terminals of the heretofore known sensor device.

The sensor device 1 is such that, when molding the housing portion 6 from molding resin, it is necessary to insert the leading end portions 3a, 4a, and 5a of the metal terminals 3, 4, and 5 into a die 8, as shown in, for example, FIG. 11. At the time of inserting, when the metal terminals 3, 4, and 5 are seen from a direction (hereafter called a pin direction) the reverse of a direction of the leading end portions 3a, 4a, and 5a seen from leading ends 3b, 4b, and 5b thereof in FIG. 11, the metal terminals 3 and 4 are disposed so that at least one portion thereof is aligned with the metal terminal 5. Because of this, it is difficult to press the metal terminals 3 and 4 down in the pin direction when inserting them in the die 8, and it is difficult to obtain a high accuracy of the positions of the leading end portions 3a, 4a, and 5a inserted into the die 8, that is, of the pin height h.

As can be understood from FIG. 11, as the pin height h is regulated by the contact surface between the leading ends 3b, 4b, and 5b of the leading end portions 3a, 4a, and 5a and the die 8, it is not possible to visually confirm the pin height h when inserting the metal terminals 3, 4, and 5 into the die 8. In this case, together with the difficulty of pressing down the metal terminals 3 and 4, there is a possibility that it will lead to an increase in variation of the pin height h due to an insufficient amount of the metal terminals 3 and 4 being inserted into the die 8, or to a deformation of the metal terminals 3 and 4 due to excessive insertion force.

SUMMARY OF THE INVENTION

The invention, bearing in mind the heretofore described kind of problem, has an object of providing a sensor device wherein it is possible to easily ensure positioning accuracy with respect to a die of metal terminals extended from a detector portion.

A sensor device according to one aspect of the invention includes a detector portion, plural metal terminals that transmit a detection signal from the detector portion, and a housing portion, which integrally supports the detector portion and metal terminals, formed from resin. Leading end portions of the plural metal terminals configure connector terminals, and the plural metal terminals are disposed with at least one portion thereof aligned when seen from the axial direction of the connector terminals. Protruding portions protruding in a direction differing from the axial direction of the connector terminals are provided on the metal terminals.

The sensor device according to the invention is such that the leading end portions of the plural metal terminals configure the connector terminals, and protruding portions protruding in a direction differing from the axial direction of the connector terminals are provided on the metal terminals, which are disposed so that at least one portion thereof is aligned when seen from the axial direction of the connector terminals, meaning that it is possible to insert the metal terminals into the die by pressing down the protruding portions.

Because of this, it is possible to ensure positioning accuracy of the metal terminals with respect to the die.

The foregoing and other objects, features, aspects and advantages of the present invention will become more apparent from the following detailed description of the present invention when taken in conjunction with the accompanying drawings.

DETAILED DESCRIPTION OF THE INVENTION

Hereafter, referring to the drawings, a description will be given of preferred embodiments of a sensor device according to the invention.

First Embodiment

Figure 1:
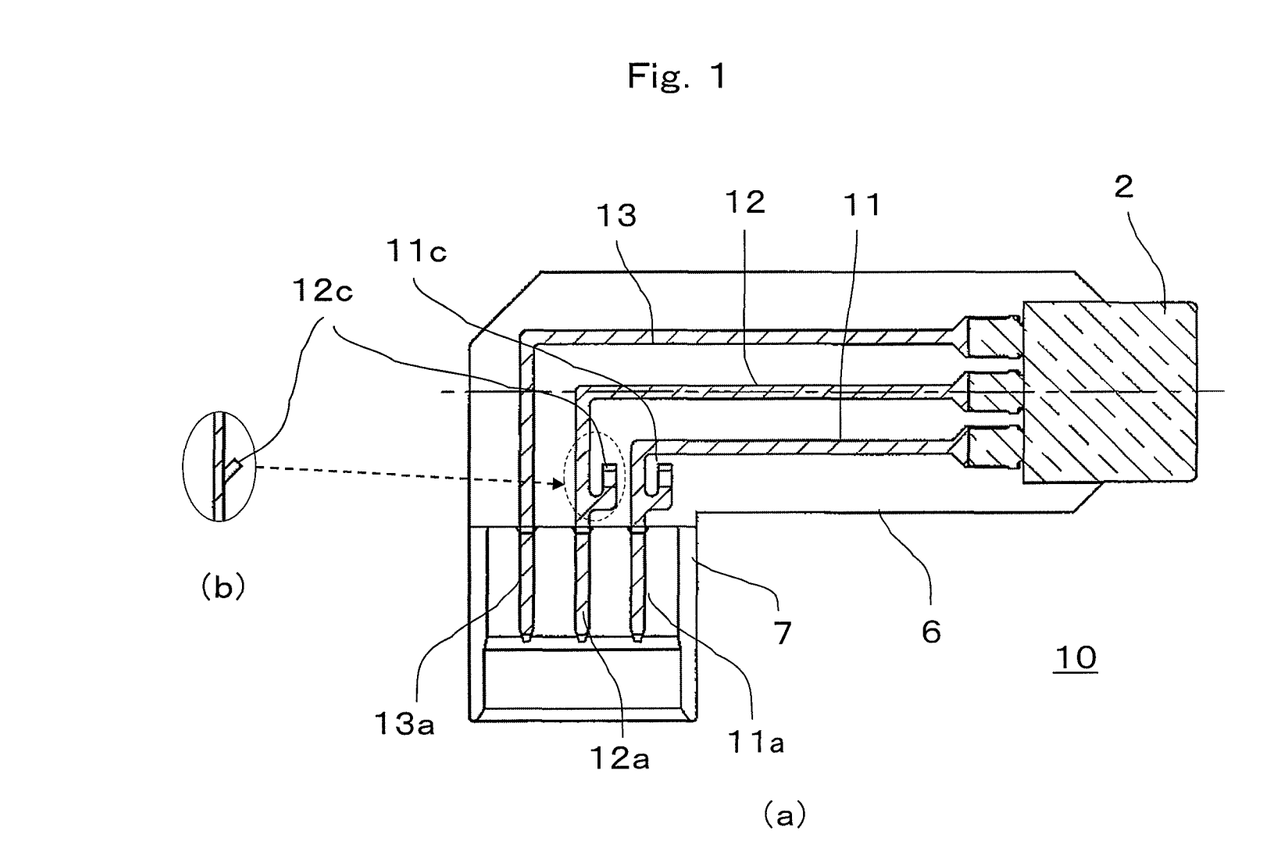
FIG. 1A is a sectional view of a sensor device according to a first embodiment of the invention seen from the front.
FIG. 1B is a sectional view of protruding portions of FIG. 1A seen from the side.

A description will be given, based on FIGS. 1A and 1B, of a sensor device according to a first embodiment of the invention. FIG. 1A is a sectional view of the sensor device 10 according to the first embodiment seen from the front. The sensor device 10, in almost the same way as a heretofore known sensor device 1 illustrated in FIG. 10, is such that, for example, three electrodes (not shown) electrically connected to a sensor chip incorporated into a detector portion 2 are provided, and the electrodes are connected one each by welding or the like to the base end portions of three metal terminals 11, 12, and 13 that form, for example, a power supply terminal, an output terminal, and a ground terminal of the detector portion 2. The three metal terminals 11, 12, and 13 are extended from the detector portion 2 in such a way as to be aligned with each other in the same perpendicular plane direction, that is, in the up-down direction in FIG. 1A, and the metal terminals 11, 12, and 13 and detector portion 2 are integrally supported by a housing portion 6 molded from a molding resin or the like. Then, there is configured a connector portion 7 with leading end portions 11a, 12a, and 13a (portions of the metal terminals exposed outside the molding resin) of the metal terminals 11, 12, and 13 as connector terminals. The housing portion 6, as will be described hereafter, is formed, after an assembly is formed by connecting the detector portion 2 and metal terminals 11, 12, and 13 by welding or the like, by inserting the assembly into a molding die and injecting a molding resin or the like. The number of metal terminals not being specified as the three metal terminals 11, 12, and 13, it is sufficient that there are plural metal terminals.

The connector portion 7 is of an orientation such that it is formed perpendicular to the axes of the metal terminals 11, 12, and 13 connected to the detector portion 2, as shown in FIG. 1A, and the metal terminals 11, 12, and 13 are of a form such that they are bent partway along into a perpendicular direction. Then, the orientation of the leading end portions 11a, 12a, and 13a of the metal terminals 11, 12, and 13 is aligned with the orientation of the connector portion 7. Also, protruding portions 11c and 12c are provided on the leading end portions 11a and 12a of the metal terminals 11 and 12 in a direction differing from the pin direction so as not to be aligned when seen from the pin direction, as shown in FIG. 1B. FIG. 1B is a sectional view of the protruding portions 11c and 12c of FIG. 1A seen from the side.

Figure 2:
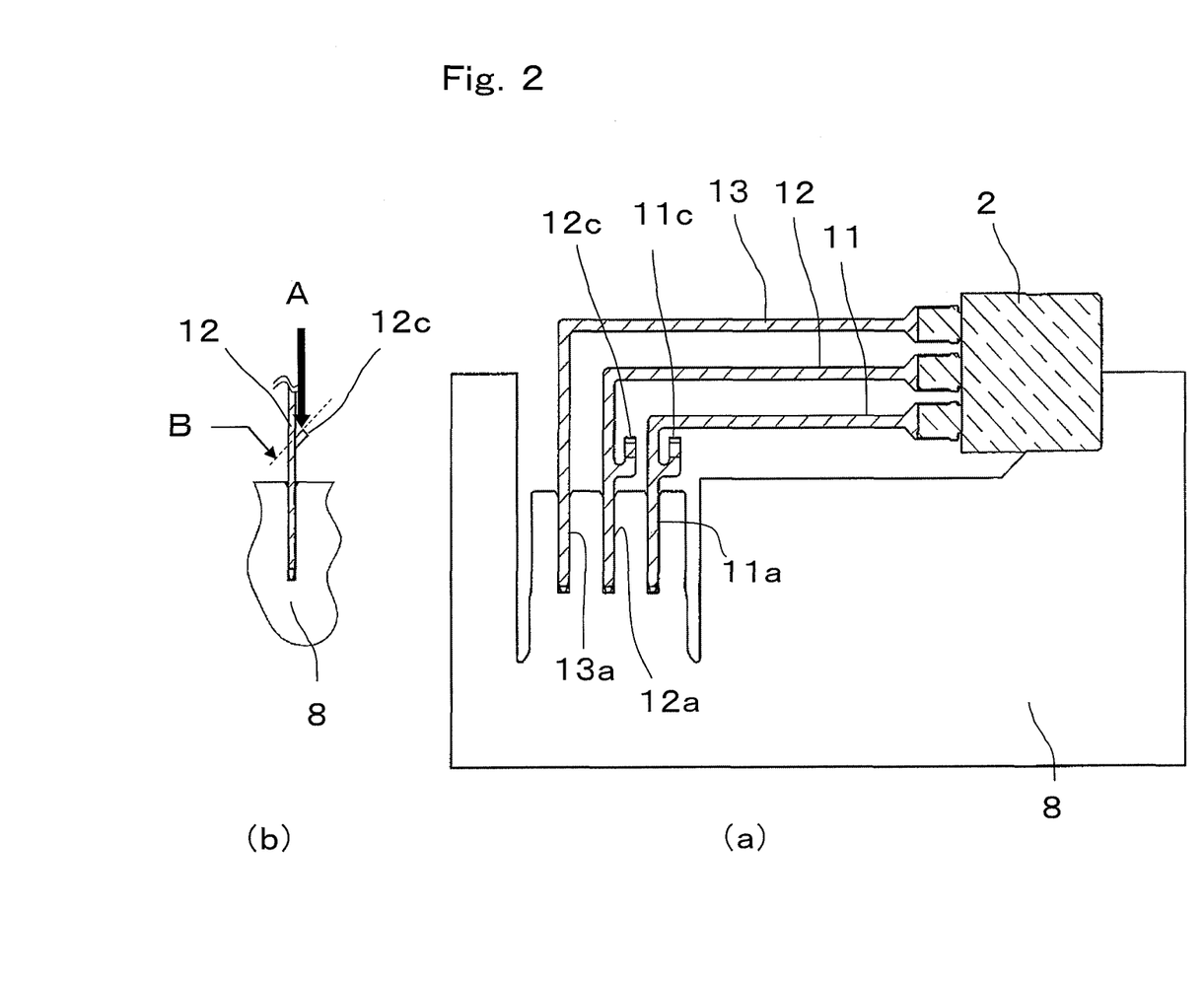
FIGS. 2A and 2B are diagrams showing a condition before molding of metal terminals of the sensor device according to the first embodiment of the invention.

In a molding resin molding process of the sensor device 10 configured as heretofore described, the metal terminals 11, 12, and 13 connected to the detector portion 2 are inserted into a molding die 8, as shown in FIG. 2A, and the molding resin is molded. When the leading end portions 11a, 12a, and 13a of the metal terminals 11, 12, and 13 are inserted into the die 8, the metal terminal 13 is such that the leading end portion 13a thereof can be pressed down, and the metal terminals 11 and 12, as indicated by reference character A in FIG. 2B, are such that the protruding portions 11c and 12c can be pressed down. Because of this, it is possible to insert the leading end portions 11a, 12a, and 13a of the metal terminals 11, 12, and 13 accurately positioned in the die 8. Also, workability is improved by providing the plural protruding portions 11c and 12c on the same plane, as indicated by reference character B in FIG. 2B. FIG. 2B is a sectional view of the leading end portions 11a and 12a of the metal terminals 11 and 12 of FIG. 2A seen from the side.

Figure 3:
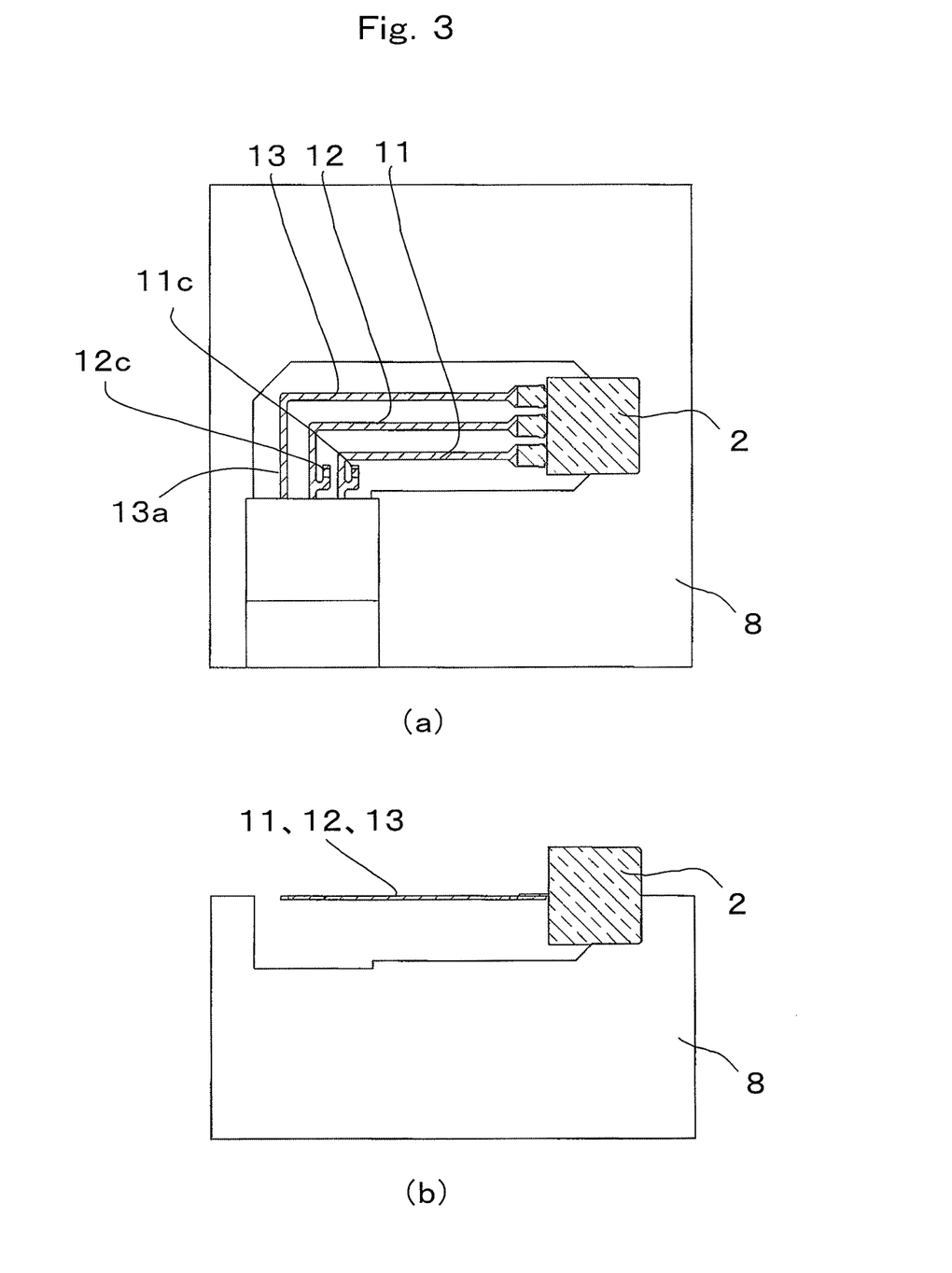
FIGS. 3A and 3B are diagrams showing a condition before molding of metal terminals of a sensor device whose parting direction differs from that of FIGS. 1A and 1B.

Also, the advantage of the protruding portions 11c and 12c as pressing members when inserting the metal terminals 11, 12, and 13 into the die 8 is obtained regardless of the parting direction of the die 8. As an example, a condition before molding when the parting direction of the die 8 is a direction perpendicular with respect to FIG. 2A is shown in FIGS. 3A and 3B. FIG. 3A is a diagram seen from above, and FIG. 3B is a sectional view seen from the front. The direction of insertion of the metal terminals 11, 12, and 13 into the die 8 shown in FIGS. 3A and 3B is a direction perpendicular with respect to FIGS. 2A and 2B. In this case too, by the leading end portion 13a of the metal terminal 13 being pressed down, and by the protruding portions 11c and 12c of the metal terminals 11 and 12 being pressed down, it is possible to insert the leading end portions 11a, 12a, and 13a of the metal terminals 11, 12, and 13 accurately positioned in the die 8.

Figure 4:
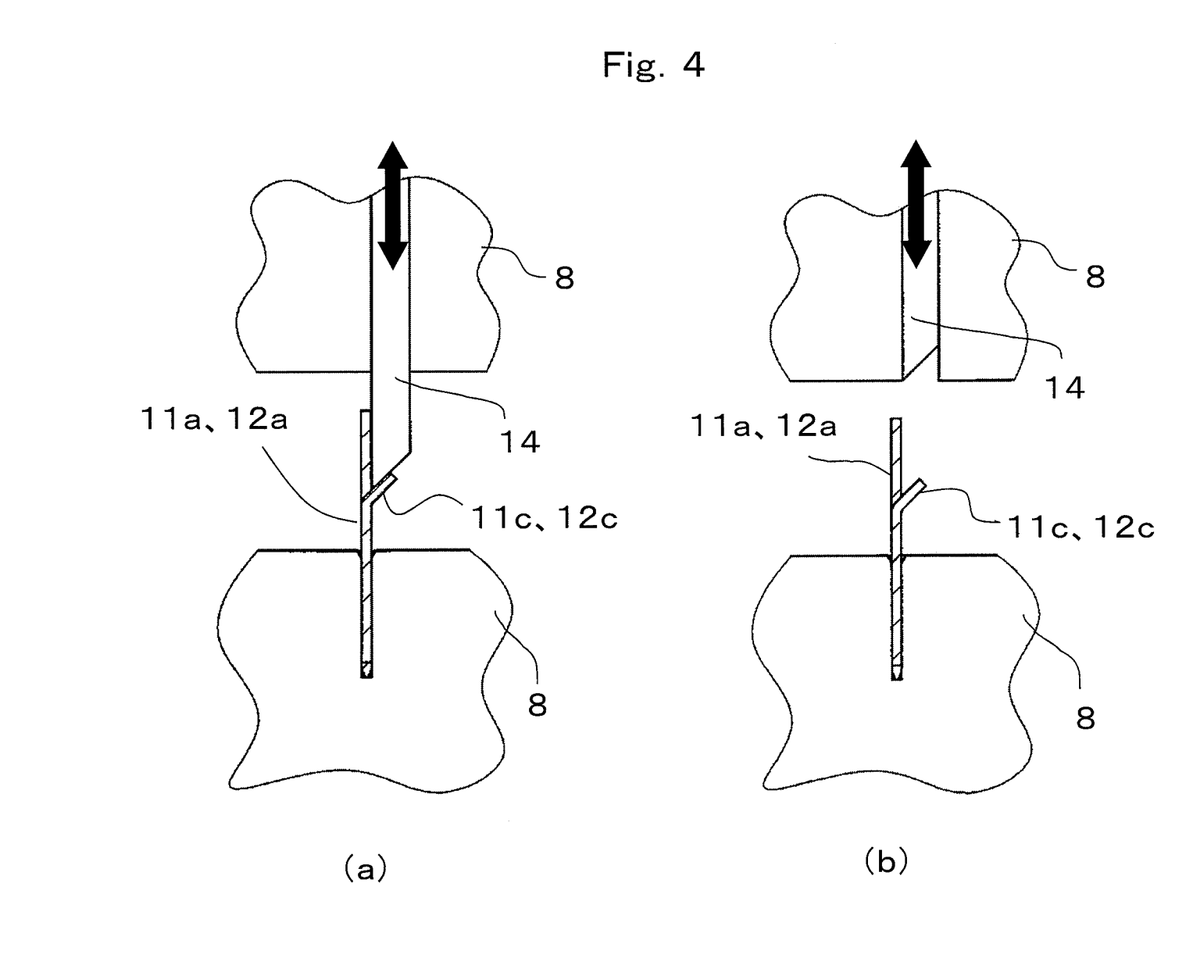
FIGS. 4A and 4B are schematic diagrams illustrating a condition when molding the sensor device according to the first embodiment of the invention.

Furthermore, when inserting the metal terminals 11 and 12 into the die 8, it is possible to utilize the die 8 as a way of pressing down the protruding portions 11c and 12c. This style will be described using FIGS. 4A and 4B. Firstly, the leading end portions 11a and 12a of the metal terminals 11 and 12 are inserted into the die 8. At this time, the positioning accuracy of the leading end portions 11a and 12a is not an issue. Subsequently, as shown in FIG. 4A, the protruding portions 11c and 12c are pressed down simultaneously with the die 8 closing by a block 14 provided on the side of the die 8 opposite to the side into which the leading end portions 11a and 12a are inserted, and the leading end portions 11a and 12a of the metal terminals 11 and 12 are inserted into the die 8. As shown in FIG. 4B, the block 14 is taken out before the molding material is introduced into the die 8. Because of this, it is possible to insert the leading end portions 11a and 12a of the metal terminals 11 and 12 accurately positioned in the die 8 using the form accuracy of the die 8.

The protrusion form of the protruding portions 11c and 12c of the metal terminals 11 and 12 can be formed by sheet metal working. Normally, as sheet metal working is used in the formation of the metal terminals 11 and 12, it is possible to form the protruding portions 11c and 12c on the metal terminals 11 and 12 without increasing the processes.

Second Embodiment

Figure 5:
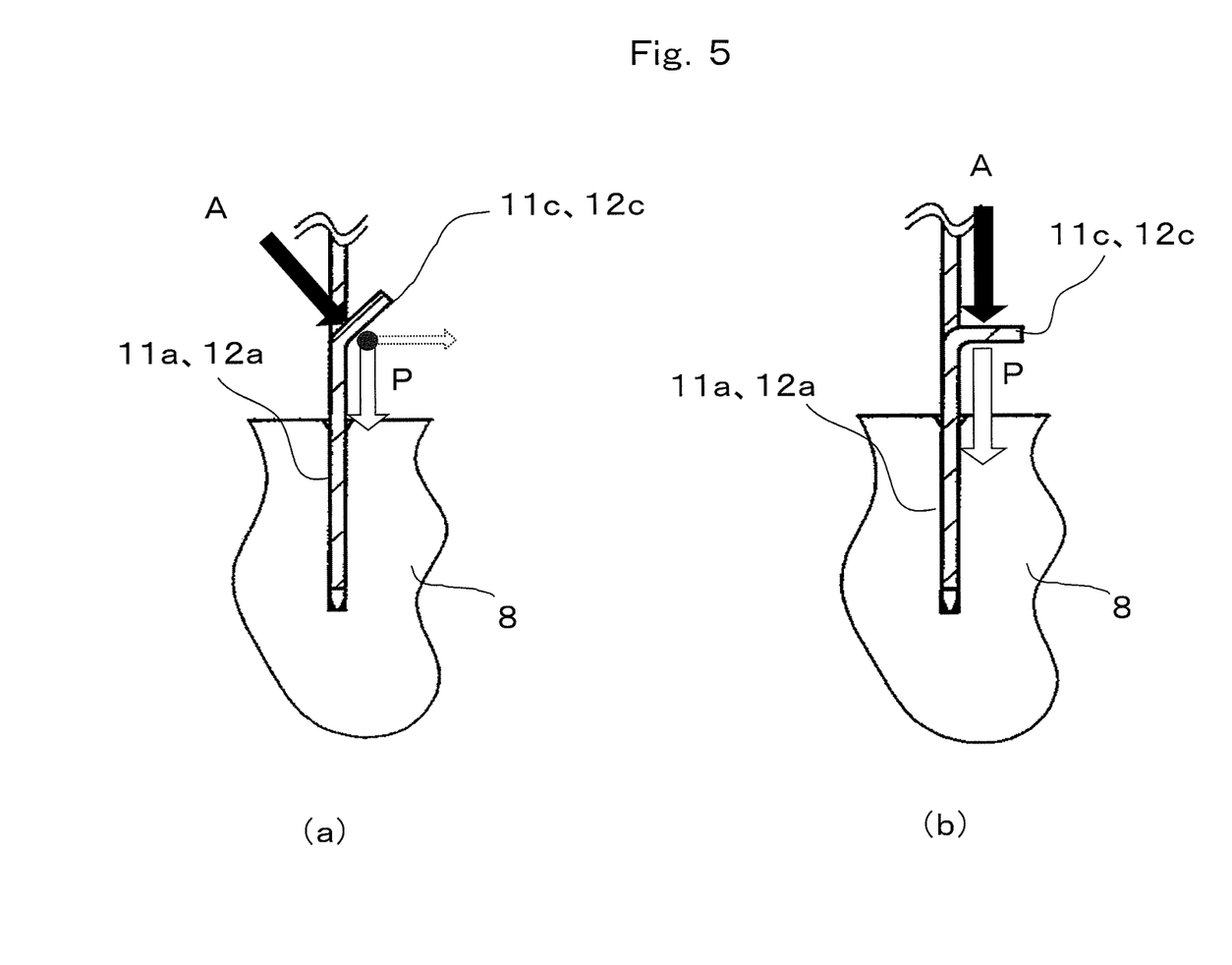
FIGS. 5A and 5B are diagrams comparing protrusion directions of protruding portions of metal terminals of a sensor device according to a second embodiment of the invention and force applied when inserting the sensor device into a die.

Next, a description will be given of a second embodiment of the invention. FIGS. 5A and 5B are diagrams illustrating a sensor device according to the second embodiment. In order to improve workability when inserting the leading end portions 11a and 12a of the metal terminals 11 and 12 described in the first embodiment into the die 8, it is effective, when pressing down the protruding portions 11c and 12c, to press down in a direction perpendicular with respect to a plane seen from the pin direction of the protruding portions 11c and 12c, as indicated by reference character A, as shown in FIG. 5A, but in order to suppress deformation of the leading end portions 11a and 12a of the metal terminals 11 and 12 when inserting into the die 8, it is preferable that no force is applied to the leading end portions 11a and 12a other than in the pin direction. Because of this, as it is preferable that the protrusion direction of the protruding portions 11c and 12c is perpendicular to the pin direction, as indicated by reference character A of FIG. 5B, the protruding portions 11c and 12c are formed by bending. Reference character P shown in FIGS. 5A and 5B indicates the force of inserting the leading end portions 11a and 12a into the die 8. Other configurations are the same as in the first embodiment, and are omitted from the drawings.

Third Embodiment

Figure 6:
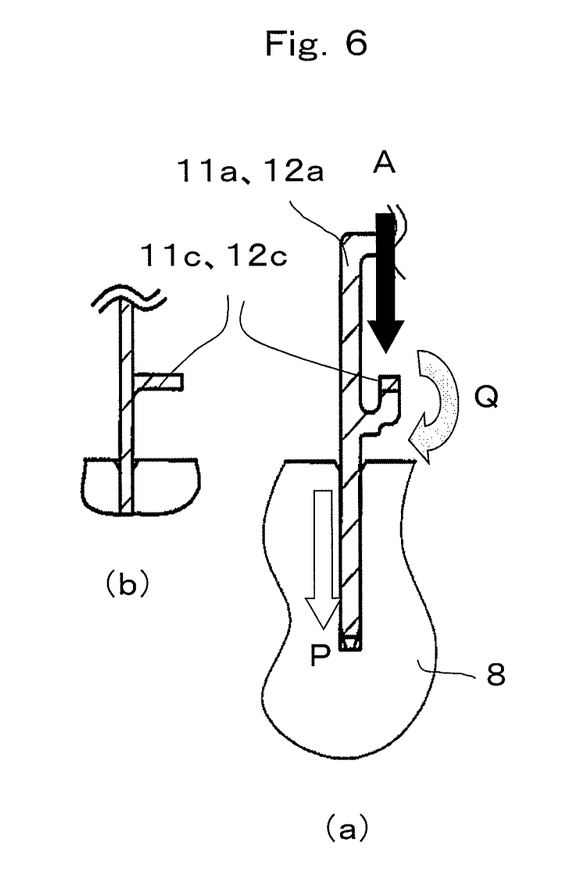
FIGS. 6A and 6B are diagrams comparing protrusion directions of protruding portions of metal terminals of a sensor device according to a third embodiment of the invention and force applied when inserting the sensor device into a die.
Figure 7:
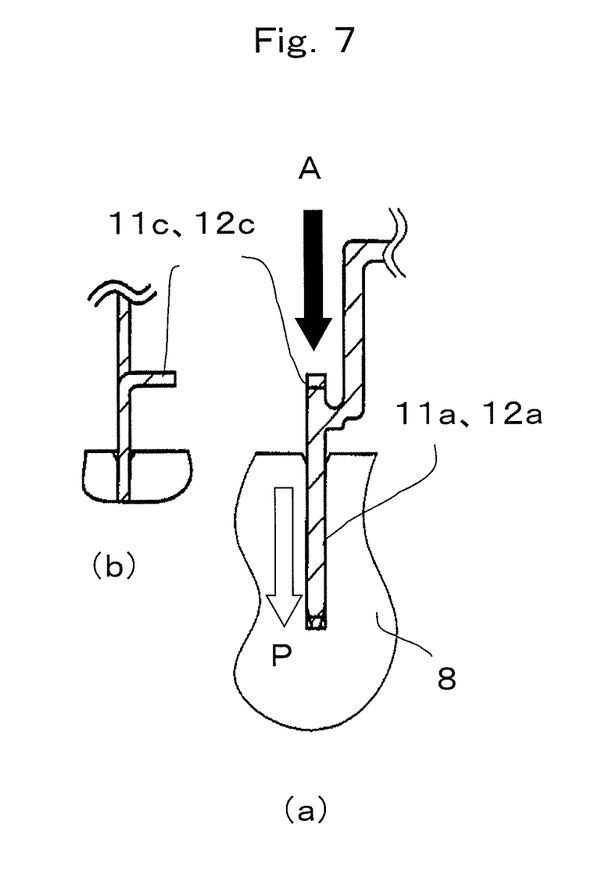
FIGS. 7A and 7B are diagrams comparing protrusion directions of the protruding portions of the metal terminals of the sensor device according to the third embodiment of the invention and force applied when inserting the sensor device into a die.

Next, a description will be given of a third embodiment of the invention. FIGS. 6A to 7B are diagrams illustrating a sensor device according to the third embodiment. When inserting the leading end portions 11a and 12a of the metal terminals 11 and 12 into the die 8, it is good, in order to suppress deformation of the leading end portions 11a and 12a of the metal terminals 11 and 12, that the protruding portions 11c and 12c are provided in the vicinity of the axes of the leading end portions 11a and 12a, in order that a bending moment Q acting on the leading end portions 11a and 12a is reduced, and it is preferable that the bases of the protruding portions 11c and 12c are on the axes of the leading end portions 11a and 12a, as shown in FIGS. 6A to 7B. FIG. 6A shows a case in which the bases of the protruding portions 11c and 12c are somewhere other than on the axes of the leading end portions 11a and 12a, FIG. 7A shows a case in which the bases of the protruding portions 11c and 12c are on the axes of the leading end portions 11a and 12a, and FIGS. 6B and 7B are sectional views of FIGS. 6A and 6B respectively, seen from the side. Other configurations are the same as in the first embodiment, and are omitted from the drawings.

Fourth Embodiment

Figure 8:
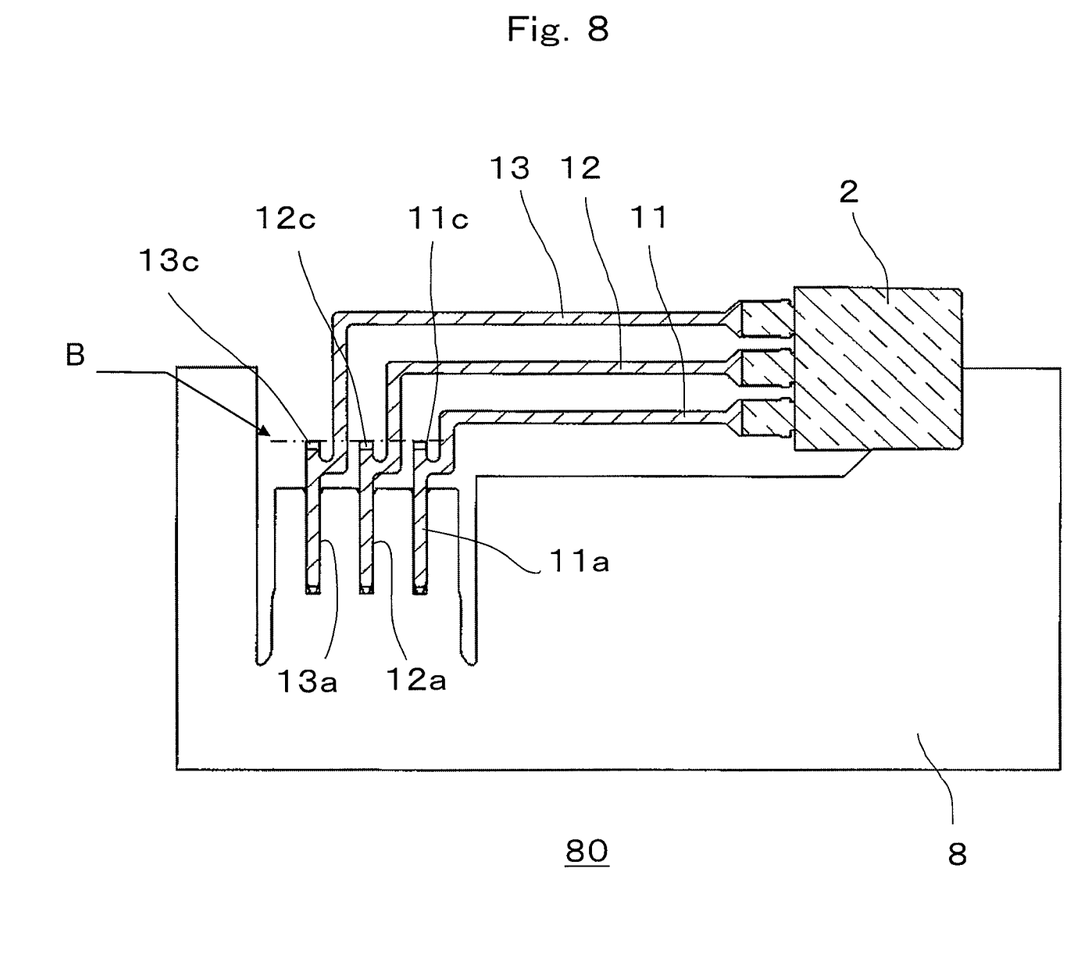
FIG. 8 is a diagram showing a condition before molding of metal terminals of a sensor device according to a fourth embodiment of the invention.

Next, a description will be given of a fourth embodiment of the invention. FIG. 8 is a diagram illustrating a sensor device according to the fourth embodiment. In the first to third embodiments, a description has been given of a case in which the protruding portions 11c and 12c are provided on the leading end portions 11a and 12a, of the leading end portions 11a, 12a, and 13a of the three metal terminals 11, 12, and 13 respectively, but a protruding portion 13c may also be provided on the leading end portion 13a of the metal terminal 13, as shown in FIG. 8, and it is also possible to provide a protruding portion on a metal terminal, of the plural metal terminals connected to the detector portion 2, that is not aligned when seen from the pin direction. In this case, it is possible to align on the same plane the places pressed down when inserting the plural metal terminals into the die. By so doing, workability is improved. Reference numerals and characters which are used in FIG. 8 and are the same as those in FIGS. 1A and 1B indicate the same items as those illustrated in FIGS. 1A and 1B, and reference numeral 80 indicates the sensor device according to the fourth embodiment.

Fifth Embodiment

Figure 9:
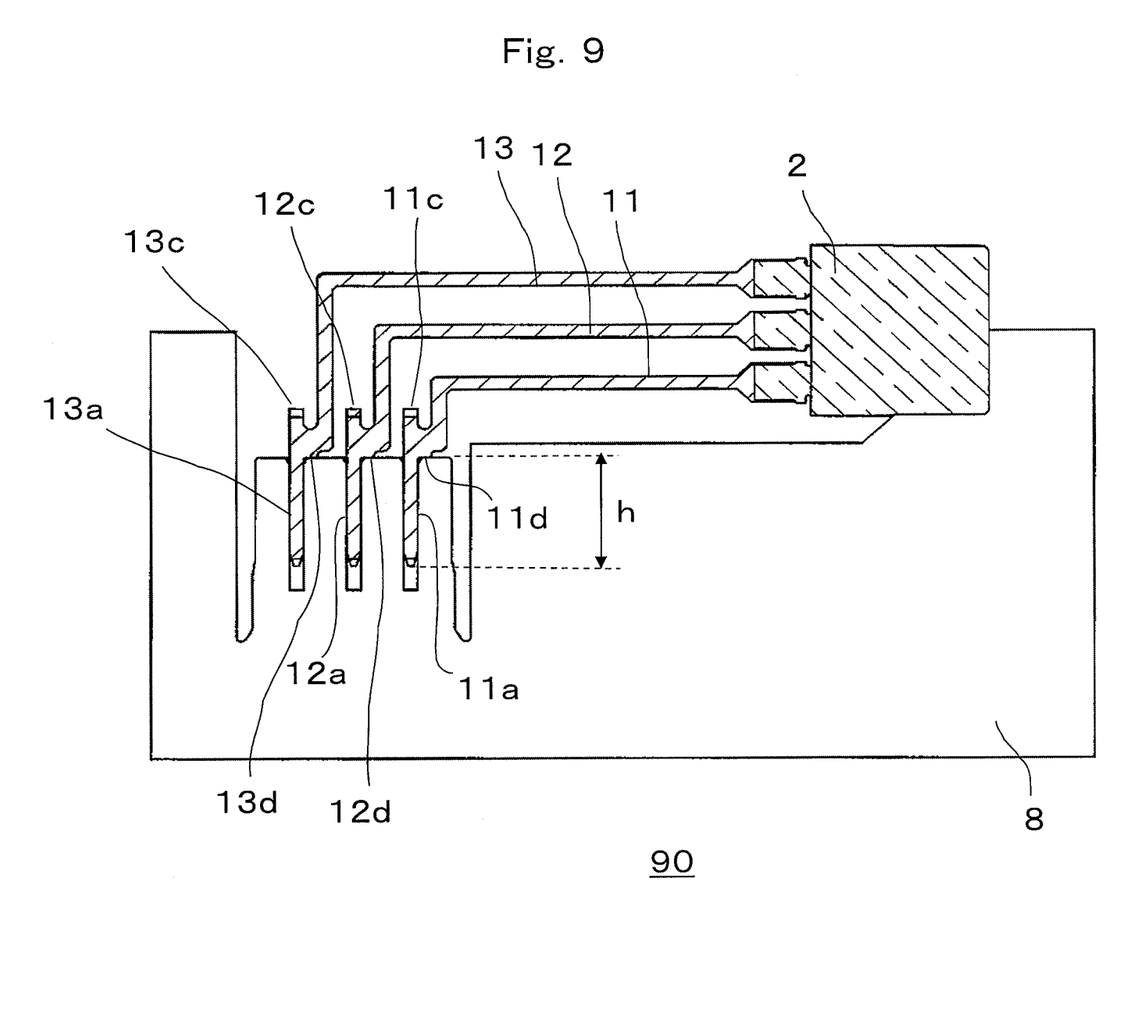
FIG. 9 is a diagram showing a condition before molding of metal terminals of a sensor device according to a fifth embodiment of the invention.

Next, a description will be given of a fifth embodiment of the invention. FIG. 9 is a diagram illustrating a sensor device according to the fifth embodiment. The sensor device 90 of the fifth embodiment is such that, as shown in FIG. 9, contact portions 11d, 12d, and 13d, which come into contact with the die 8, are provided before the leading end of the leading end portions 11a, 12a, and 13a of the metal terminals 11, 12, and 13 respectively. As other configurations are the same as in the fourth embodiment, they are given the same reference numerals and characters, and a description is omitted.

That it is possible to observe the contact between the contact portions 11d, 12d, and 13d and the die 8 when inserting the leading end portions 11a, 12a, and 13a of the metal terminals 11, 12, and 13 into the die 8, and thus possible to confirm the depth of the insertion of the leading end portions 11a, 12a, and 13a of the metal terminals 11, 12, and 13 into the die 8, can be suggested as an advantage of the contact portions 11d, 12d, and 13d. It is possible to inhibit variation in a pin height h due to insufficient insertion of the leading end portions 11a, 12a, and 13a into the die 8, and deformation of the leading end portions 11a, 12a, and 13a due to excessive insertion force, and ensure accurate positioning of the leading end portions 11a, 12a, and 13a in the die 8.

Heretofore, a description has been given of the first to fifth embodiments of the invention but, in the embodiments, a case wherein the protruding portion is provided on the leading end portion of the metal terminal has been illustrated. However, the position of formation of the protruding portion not being limited to the leading end portion of the metal terminal, it is possible to achieve an equivalent advantage whatever position on the metal terminal the protruding portion is formed on.

Various modifications and alterations of the invention will be apparent to those skilled in the art without departing from the scope and spirit of the invention, and it should be understood that this is not limited to the illustrative embodiments set forth within.

What is claimed is:
1. A sensor device, comprising:
   a detector portion;
   a plurality of metal terminals contacting the detector portion and transmitting a detection signal from the detector portion; and
   a housing portion, which supports both the detector portion and metal terminals, formed from resin, the plurality of metal terminals further comprising:
base end portions which are adjacent to the detector portion;
leading end portions comprising connector terminals, and the plurality of metal terminals being disposed with at least one portion thereof aligned when seen from an axial direction of the connector terminals; and
protruding portions which are disposed on the leading end portions and protrude in a direction differing from the axial directions of the base end portions and leading end portions and are not disposed on a plane formed by the base end portions and leading end portions of the plurality of metal terminals.

2. The sensor device according to claim 1, wherein
the protruding portions are formed on the plurality of the metal terminals, and the protruding portions are provided on the same plane.

3. The sensor device according to claim 1, wherein
the protruding portions are of a form extending in a direction perpendicular to the axial direction of the connector terminals.

4. The sensor device according to claim 1, wherein
the bases of the protruding portions are formed on the axes of the connector terminals.

5. The sensor device according to claim 1, wherein
each of the plurality of metal terminals is provided with a protruding portion.

6. The sensor device according to claim 1, wherein
contact portions that make contact with a die that molds the housing portion are provided in the vicinity of the leading end portions of the connector terminals.

7. The sensor device according to claim 1, wherein
the protruding portions are formed by bending in a direction perpendicular to the axial direction of the connector terminals.

8. The sensor device according to claim 1, wherein
the connector terminals of the leading end portions are exposed outside the housing portion, and the protruding portions are disposed on intermediate portions between the connector terminals and the base end portions of the plurality of metal terminals.

* * * * *